United States Patent
Wang (10) Patent No.: US 12,156,252 B2
(45) Date of Patent: Nov. 26, 2024

(54) DATA PACKET TYPE-DRIVEN DATA PROCESSING METHOD, APPARATUS, DEVICE AND COMPUTER-READABLE STORAGE MEDIUM

(71) Applicant: TP-LINK CORPORATION LIMITED, Hong Kong (CN)

(72) Inventor: Xiaolong Wang, Shenzhen (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/412,488

(22) Filed: Jan. 13, 2024

(65) Prior Publication Data
US 2024/0155685 A1   May 9, 2024

Related U.S. Application Data (63) Continuation of application No. 18/562,818, filed as application No. PCT/CN2023/074253 on Feb. 2, 2023, now abandoned.

(30) Foreign Application Priority Data

Feb. 14, 2022 (CN) ............................ 202210150739

(51) Int. Cl.
*H04W 74/0816* (2024.01)
(52) U.S. Cl.
CPC ............................... *H04W 74/0816* (2013.01)
(58) Field of Classification Search
CPC .................................................. H04W 74/0816
See application file for complete search history.

(56) References Cited

U.S. PATENT DOCUMENTS

| 2016/0218819 A1* | 7/2016 | Yang ................. H04L 12/40045 |
| 2016/0309480 A1* | 10/2016 | Verma ............... H04W 52/0216 |

(Continued)

FOREIGN PATENT DOCUMENTS

| CN | 102395147 A | 3/2012 |
| CN | 103428772 A | 12/2013 |

(Continued)

OTHER PUBLICATIONS

Ksentini et al., "Determinist contention window algorithm for IEEE 802.11," 2005 IEEE 16th International Symposium on Personal, Indoor and Mobile Radio Communications, Berlin, Germany, 2005, pp. 2712-2716 (Year: 2005).*

(Continued)

*Primary Examiner* — Un C Cho
*Assistant Examiner* — Lalita W Pace
(74) *Attorney, Agent, or Firm* — Loeb & Loeb LLP (57) ABSTRACT

The present disclosure discloses a data processing method, apparatus, device, and computer-readable storage medium, wherein the method is performed by a transmitting terminal, and the method includes: in response to a type of a data packet to enter a transmission queue of the transmitting terminal being a preset type, determining a timing when the data packet is expected to enter the transmission queue of the transmitting terminal as an expected transmitting timing; and in response to a duration from current timing to the expected transmitting timing being within a preset range, initiating a channel contention operation related to transmitting the data packet, wherein the channel contention operation related to transmitting the data packet includes carrier sensing, waiting for a distributed inter-frame spacing DIFS, and waiting for a back-off window.

16 Claims, 2 Drawing Sheets

(56) References Cited

U.S. PATENT DOCUMENTS

2020/0205199 A1\*  6/2020  Newman ............... H04L 1/1887
2020/0396768 A1\* 12/2020  Abouelseoud .... H04W 74/0816
2021/0076420 A1\*  3/2021  Xin ..................... H04L 47/2441

FOREIGN PATENT DOCUMENTS

| CN | 105828112 A |  8/2016 |
|----|-------------|---------|
| CN | 104661320 B |  3/2019 |
| CN | 112996050 A |  6/2021 |
| CN | 113796153 A | 12/2021 |
| CN | 113812205 A | 12/2021 |
| CN | 114630447 A |  6/2022 |
| EP |   2584738 A1 |  4/2013 |

OTHER PUBLICATIONS

Paudel et al., "I-DCF: Improved DCF for Channel Access in IEEE 802.11 Wireless Networks," 2014 IEEE 79th Vehicular Technology Conference (VTC Spring), Seoul, Korea (South), 2014, pp. 1-5 (Year: 2014).\*

\* cited by examiner

DATA PACKET TYPE-DRIVEN DATA PROCESSING METHOD, APPARATUS, DEVICE AND COMPUTER-READABLE STORAGE MEDIUM

CROSS-REFERENCE TO RELATED APPLICATION

This application is a continuation of U.S. application Ser. No. 18/562,818, filed on Nov. 20, 2023, which is a national phase filing of International Application No. No. PCT/CN2023/074253, filed on Feb. 2, 2023, which claims the priority to and benefits of priority of China Patent Application No. 202210150739.5 filed on Feb. 14, 2022. All the aforementioned patent applications are hereby incorporated by reference in their entireties.

TECHNICAL FIELD

The present disclosure belongs to the technical field of communication, and in particular, to a data processing method, apparatus, device, and computer-readable storage medium.

BACKGROUND

According to IEEE 802.11 protocol, wireless media access of MAC (Media Access Control Layer) in a WIFI network is controlled by a coordination function. At present, a DCF (Distributed Coordination Function) mechanism has been proposed to enable respective wireless terminals to share wireless channels and to reduce channel collisions.

The current DCF mechanism requires each data packet to go through a complete DCF cycle, and it is not possible to adjust the priority of each data packet during the transmission, resulting in a long communication delay and low data transmission efficiency when transmitting data packets. Therefore, it is necessary to further improve the coordination function in the WIFI network.

SUMMARY

The embodiments of the present disclosure provide a scheme different from the prior art, so as to address the technical challenge in the prior art, which relates to long communication delay of data packets demanding high real-time communication.

In a first aspect, the present disclosure provides a data processing method, comprising: determining whether a type of a next data packet to be received is a preset type, and if so, determining whether a duration from a current timing to a receiving timing of the data packet is a preset duration, and if so, initiating a channel contention operation related to transmitting the data packet, so that after the data packet enters a transmission queue of a transmitting terminal, the data packet is accessed to a channel and transmitted over the channel, wherein the channel contention operation related to transmitting the data packet includes carrier sensing, waiting for a distributed inter-frame spacing DIFS, and waiting for a back-off window.

In a second aspect, the present disclosure provides a data processing apparatus, comprising: a first determination module, for determining whether a type of a next first data packet to be received is a preset type, and if so, a second determination module determines whether a duration from a current timing to a receiving timing of the first data packet is a preset contention duration, and if so, an initiation module initiates a contention process for the first data packet, so that after reception of the first data packet, the first data packet is accessed to a channel and transmitted over the channel, wherein the contention process includes carrier sensing, waiting for a distributed inter-frame spacing DIFS, and waiting for a back-off window.

In a third aspect, the present disclosure provides an electronic device, comprising: a processor; and a memory, for storing executable instructions of the processor; wherein the processor is configured to execute the first aspect or any of the methods in various possible implementations of the first aspect by executing the executable instructions.

In a fourth aspect, an embodiment of the present disclosure provides a computer-readable storage medium having stored thereon a computer program which, when executed by a processor, implements the first aspect or any of the methods in various possible implementations of the first aspect.

In a fifth aspect, an embodiment of the present disclosure provides a computer program product including a computer program that, when executed by a processor, implements the first aspect or any of the methods in various possible implementations of the first aspect.

In a sixth aspect, an embodiment of the present disclosure provides a data processing method performed by a transmitting terminal. The method comprises: in response to a type of data packet to enter a transmission queue of the transmitting terminal being a preset type, determining a timing when the data packet is expected to enter the transmission queue of the transmitting terminal, as an expected transmitting timing, wherein the transmission queue of the transmitting terminal is the queue where the data packet to be transmitted is located before leaving the transmitting terminal; and in response to a duration from current timing to the expected transmitting timing being within a preset range, initiating a channel contention operation related to transmitting the data packet, wherein the channel contention operation related to transmitting the data packet includes carrier sensing, waiting for a distributed inter-frame spacing (DIFS), and waiting for a back-off window.

The scheme provided by the present disclosure can play a role in shortening the communication delay of data packets demanding high real-time communication, i.e., data packets with the aforementioned preset type, and improving communication efficiency.

BRIEF DESCRIPTION

In order to illustrate the embodiments of the present disclosure or the technical scheme in the prior art more clearly, the drawings required to be used in the description of the embodiments or the prior art will be briefly introduced below. Obviously, the drawings in the following description are some embodiments of the present disclosure, and other drawings can be obtained according to these drawings without creative work for ordinary skilled in the art. In the drawings.

DETAILED DESCRIPTION

Hereinafter, a detailed description will be made for the embodiments of the present disclosure, examples of which are illustrated in the drawings. The embodiments described below with reference to the drawings are exemplary and intended to explain the present disclosure, and should not be construed as limiting the present disclosure.

The terms such as "first", "second" etc., in the description, claims and drawings of the embodiments of the present disclosure are used to distinguish similar objects, and are not necessarily used to describe a specific order or sequence. It should be understood that the data used in this way can be interchanged as appropriate, so that the embodiments of the present disclosure described herein can be implemented in other orders than those illustrated or described herein, for example. Furthermore, the terms such as "including", "having" and any variations thereof are intended to cover non-exclusive inclusion, for example, a process, method, system, product or device that contains a series of steps or units is not necessarily limited to those explicitly listed steps or units, but may include other steps or units not explicitly listed or inherent to such a process, method, system, product or device.

The current DCF mechanism can be summarized that: before data transmission, each wireless terminal (e.g., STA or AP supporting WIFI protocol) will check whether its wireless link for transmitting data is in a clear state. In order to avoid collisions, when a certain wireless device has occupied the shared channel to transmit data, the remaining wireless devices will randomly select a back-off time for its frame to be transmitted. After the back-off time, these wireless devices may optionally use RTS/CTS (Request to Transmit/Clear to Transmit protocol) to obtain the state of the channel, so as to avoid channel collision during the transmission of the frame.

Specifically, the current DCF mechanism includes the following steps to realize the transmission of data packets: 1) causing a data packet to enter a transmission queue (or a queue to be transmitted or to be sent); 2) performing carrier sensing on an idle channel; 3) waiting for a DIFS (Distributed Inter-frame Spacing); 4) waiting for a back-off window: 5) accessing to a channel and transmitting the data packet. However, steps 2) to 4) usually take a long time. For applications with real-time requirements or low delay demands (applications such as online games, industrial automation control, etc.), it is difficult for the current DCF mechanism to ensure that the data packets corresponding to such applications can be transmitted with a low delay.

Specifically, it is assumed that the cycle for a wireless device to transmit a data packet is a preset value T, and the sum of time consumed by the wireless device in the above steps 2) to 4) performed for transmitting the data packet is a preset value Tcontend, and the duration of the data packet staying in the transmitting queue is twait (including a total duration from when the data packet enters the transmission queue to when the data packet is transmitted out). Based on this assumption, the following equations can be solved.

The timing tqueued_n when the n th data packet completes step 1) (the data packet arrives at the transmission queue) can be calculated as tqueued_n=T*n+tqueued_0, where tqueued_0 is the timing when the 0th data packet (n starts from 0, n=0, 1, 2, . . . ) completes step 1). The timing tlisten_n when the n th data packet starts step 2) (carrier sensing) can be calculated as tlisten_n=tqueued_n. The timing tsend_n when the nth data packet completes step 4) (accessing channel) can be calculated as tsend_n=tlisten_n+Tcontend. The waiting duration twait_n before the n th data packet is transmitted can be calculated as twait_n=tsend_n−tqueued_n.

According to the above equations, it can be known that the wireless device needs to wait for at least the duration twait_n from the timing when the data packet arrives at the transmission queue to the timing when the data packet is successfully send out. In terms of real-time applications, the latency is too long. Thus the above scheme needs to be further improved to reduce communication delay while avoiding collisions.

In this regard, it is taken into account that the data packets of applications with real-time requirements (applications such as online games, industrial automation control, etc.) have characteristics like periodic transmitting and small packet length. The various embodiments of the present disclosure provide a scheme that can prioritize this type of data packet in queue scheduling. When the data packet arrives at the transmission queue, the queuing program detects the data packet type, that is, inserts it at the head of the transmission queue (assuming that the queue is dequeued from the head), i.e., enables the data packet to leave the transmission queue first, so that the data packet would have the highest priority. The various embodiments of the present disclosure can be implemented by software or hardware, which is not limited by the present disclosure.

For example, various embodiments of the present disclosure provide a data processing method performed by a transmitting terminal, the method comprising: in response to a type of a data packet to enter a transmission queue of the transmitting terminal being a preset type, determining a timing when the data packet is expected to enter the transmission queue of the transmitting terminal as an expected transmitting timing, wherein the transmission queue of the transmitting terminal is the queue where the data packet to be transmitted is located before leaving the transmitting terminal: and in response to the duration from a current timing to the expected transmitting timing being within a preset range, initiating a channel contention operation related to transmitting the data packet, wherein the channel contention operation related to transmitting the data packet includes carrier sensing, waiting for a distributed inter-frame spacing DIFS, and waiting for a back-off window.

For example, various embodiments of the present disclosure further provide a data processing method, comprising: determining whether a type of a next data packet to be received is a preset type, and if so, determining whether a duration from current timing to receiving timing of the data packet is a preset duration, and if so, initiating a channel contention operation related to transmitting the data packet, so that after the data packet enters a transmission queue of a transmitting terminal, the data packet is accessed to a channel and transmitted, wherein the channel contention operation related to transmitting the data packet includes carrier sensing, waiting for a distributed inter-frame spacing DIFS, and waiting for a back-off window.

Compared with the existing DCF scheme for wireless networks, various embodiments of the present disclosure can adjust the timing when and the order in which the data packets (especially those with low delay demands) leave the transmission queue, and ensure that this type of data packets are transmitted preferentially. The various embodiments of the present disclosure can also reduce the latency of wireless channel contention for certain periodically transmitted data packets. The various embodiments of the present disclosure can be used with regard to real-time application data with low delay tolerance in the wireless network, obviously reducing the communication delay.

The technical scheme of the present disclosure and how the technical scheme of the present disclosure can solve the above technical problems will be described in detail with specific embodiments. The several specific embodiments in the following can be combined with each other, and the same or similar concepts or processes may not be detailed in certain embodiments. The embodiments of the present disclosure will be described below with reference to the drawings.

Figure 1A:
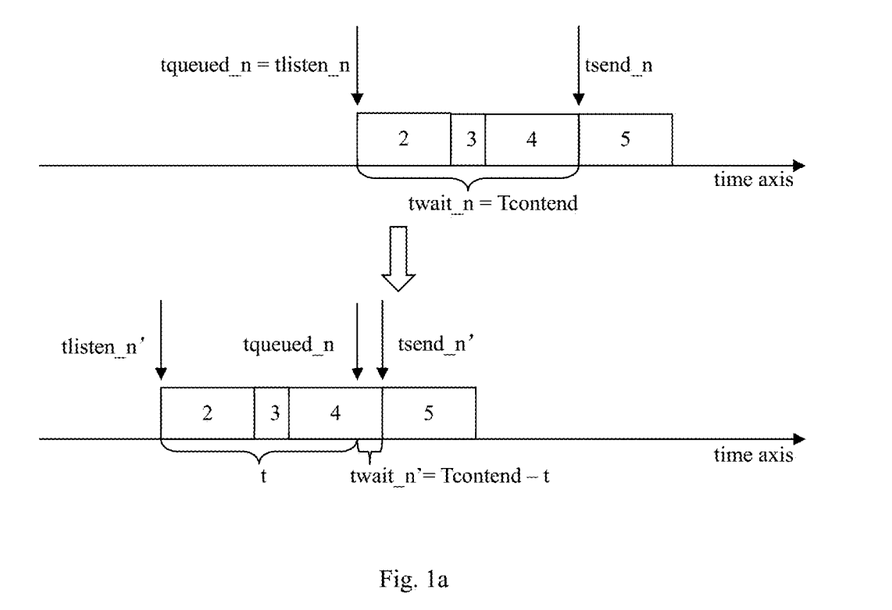
FIG. 1*a* is a flowchart of a data packet transmitting method provided by an embodiment of the present disclosure.

FIG. 1a is a flowchart of a data processing method provided by an exemplary embodiment of the present disclosure, which is applicable to any transmitting terminal with a wireless communication function, such as a router, a mobile phone, etc., which is not limited by the present disclosure. The method at least includes the following steps: firstly, in response to a type of a data packet to enter a transmission queue of the transmitting terminal being a preset type, determining a timing when the data packet is expected to enter the transmission queue of the transmitting terminal as an expected transmitting timing, wherein the transmission queue of the transmitting terminal is the queue where the data packet to be transmitted is located before leaving the transmitting terminal; and then, in response to a duration from current timing to the expected transmitting timing being within a preset range, initiating a channel contention operation related to transmitting the data packet, wherein the channel contention operation related to transmitting the data packet includes carrier sensing, waiting for a distributed inter-frame spacing DIFS, and waiting for a back-off window.

Optionally, the preset type may be game and/or industrial automation control. In some embodiments according to the present disclosure, the type of the data packet may be automatically labeled according to the application type to which the data packet belongs. Optionally, the aforementioned data packet types may be related to application types, such as games, industrial automation control, voice, and social chat. Such application types indicate that the data packet is a low-delay packet or a real-time packet.

Optionally, the method further comprises: in response to the channel contention operation related to transmitting the data packet and the data packet entering the transmission queue of the transmitting terminal, making the data packet get access to a channel, and transmitting the data packet. Specifically, making the data packet get access to a channel and transmitting the data packet comprises: after the data packet enters the transmission queue of the transmitting terminal, adding the data packet to the head of the transmission queue; and according to the order from the head of the queue to the tail of the queue, feeding the data packets in the transmission queue into the channel sequentially and transmitting the data packets.

With reference to FIG. 1a, the embodiments of the present disclosure may start carrier sensing a period of time t in advance, that is, start the carrier sensing from the timing tlisten_n−t. At the timing when the data packet arrives at the transmission queue, the transmitting terminal has already started or even completed operations such as carrier sensing, waiting for a distributed inter-frame spacing DIFS, and waiting for a back-off window. As the data packet is directly added to the head of the transmission queue, the data packet can be transmitted as soon as it enters the transmission queue, which can save t time without waiting to initiate an operation related to channel access for the data packet.

For example, the timing tlisten_n' when the carrier sensing starts for the new nth data packet, can be calculated as tlisten_n'=tlisten_n−t. Whereas the timing tsend_n' when the new nth data packet completes the operation of waiting for the back-off window can be calculated as tsend_n'=tlisten_n'+Tcontend. The waiting duration twait_n' before the new nth data packet is transmitted can be calculated as twait_n'=tsend_n'−tqueued_n. From this, it can be calculated that twait_n'=Tcontend−t.

In order to ensure that the starting timing of the data packet for accessing the channel is equal to the timing when the data packet arrives at the transmission queue, that is, twait_n'=0, t may be set to be Tcontend. Tcontend is also called an expected contention duration. Correspondingly, for this data packet, the timing when the transmitting terminal starts carrier sensing operation is changed to tlisten_n'=tqueued_0+T*n−Tcontend.

Therefore, in some example embodiments of the present disclosure, optionally, the determining of a timing when the data packet is expected to enter the transmission queue of the transmitting terminal as an expected transmitting timing comprises: based on the type of the data packet being a preset type, determining a transmitting cycle (T) of the data packet with the preset type; and based on the transmitting cycle of the data packet with the preset type, determining a timing when the data packet is expected to enter the transmission queue of the transmitting terminal as an expected transmitting timing (tsend_n').

Optionally, the initiating of a channel contention operation related to transmitting the data packet comprises: based on the type of the data packet being a preset type, determining a transmitting cycle (T) of the data packet with the preset type; estimating a duration (Tcontend) required for performing the channel contention operation related to transmitting the data packet as an expected contention duration (Tcontend) for data packet; and based on the transmitting cycle (T) of the data packet and the expected contention duration (Tcontend), determining a timing (tlisten_n'=tqueued_0+T*n−Tcontend) to initiate the channel contention operation related to transmitting the data packet, and initiating the channel contention operation related to transmitting the data packet at the timing.

Optionally, the embodiments of the present disclosure may also be applied to the case of a data packet group, that is, determining that a type of data packet to enter a transmission queue of the transmitting terminal is a preset type comprises: acquiring group information of a data packet group to enter the transmission queue of the transmitting terminal; and determining the type of the data packet as a preset type according to the group information; wherein, the group information includes a data packet type corresponding to the data packet group, the data packet group includes a plurality of data packets, the data packet type is used to indicate the types of the plurality of data packets, the types of the respective data packets among the plurality of data packets are the same, and the plurality of data packets include the said data packet to enter the transmission queue of the transmitting terminal. Optionally, in order to adapt to the situation of the data packet group, the embodiments of the present disclosure may further comprise: in response to the group information indicating that the data packet type corresponding to the data packet group is the preset type, upon receiving one data packet among the plurality of data packets, inserting the one data packet into the head of the transmission queue.

Furthermore, in the actual scenario, the transmitting cycle of the data packet and the expected contention duration which are applied in real-time may both vary with the change of the data packet type and the change of the wireless environment and may be fixed value only for a certain period of time. Based on this, various embodiments of the present disclosure may further optionally periodically calibrate the preset range and the transmitting cycle of the data packet according to a preset calibrating cycle.

For example, it is assumed that the preset calibrating cycle is Tcal, then at the beginning of the cycle, in a wireless driver, the arriving timing of the recent 0th data packet is recorded. At the end of the cycle, the arrival time of the nth data packet is recorded, and the difference tcal_0_n is calculated. At the same time, in every cycle, the contention time (including the sum of time consumed in the above steps 2, 3 and 4) for each transmitting are accumulated and recorded as Tcontend_sum, and meanwhile the number m of contentions occurred is recorded.

Then:

$$T = tcal\_0\_n/n:$$

$$Tcontend = Tcontend\_sum/m.$$

However, in practical work, T and Tcontend will vary with the change of the data packets and the change of the wireless environment and will be fixed value only for a certain period of time.

Therefore, there may be three inevitable scenarios as follows:

Scenario 1: twait_n'>0:

Step 1 (arrival of data packet) is processed before step 5 (accessing channel), and at this time the data packet needs to stay in the queue and wait for the completion of Tcontend_n;

Scenario 2: twait_n'=0, which is the ideal scenario:

Step 1 (arrival of data packet) is processed at the timing of step 5 (accessing channel), and at this time the data packet is transmitted immediately;

Scenario 3: twait_n'<0:

Step 1 (arrival of data packet) is processed after step 5 (accessing channel), and at this time there will be an empty window period, during which empty data packets or other data packets may be transmitted to maintain the connection between the device and the STA in communication with the device uninterrupted.

For the above various scenarios, as the size of the transmitting window in step 5 (accessing channel and transmitting data packet) is limited for a TXOP (transmission opportunity), if not all of the transmissions can be completed, an extra transmitting cycle can be immediately started and re-contend for transmission in the next transmitting window, without waiting for the arrival of the regular cycle T.

Therefore, by initiating a channel contention operation related to transmitting the data packet in advance before the data packet enters the transmission queue of the transmitting terminal, the waiting duration for the data packet to stay in the transmission queue is greatly saved. With regard to a data packet with a transmitting periodicity and a small packet length, the embodiments of the present disclosure can shorten the waiting duration twait_n'=tsend_n−tqueued_n to twait_n'=0 without affecting the collision resolution under the DCF mechanism, and can reduce the communication delay while avoiding collisions.

Figure 1B:
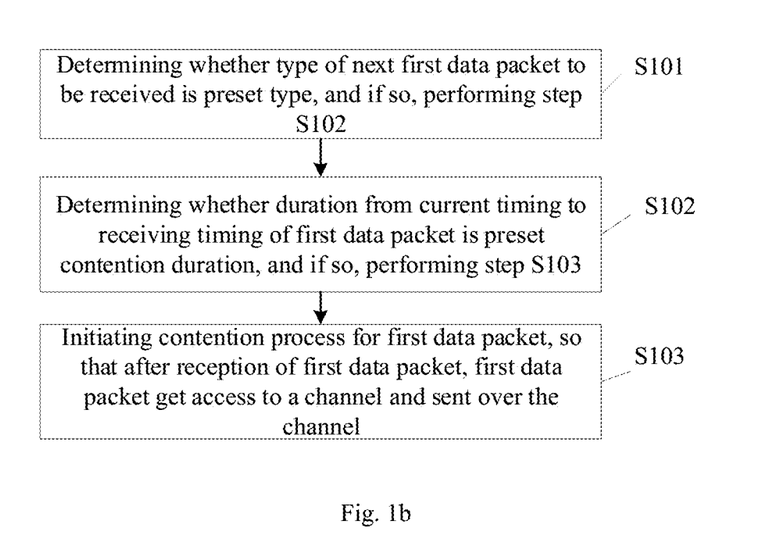
FIG. 1*b* is a flowchart of a data processing method provided by an embodiment of the present disclosure.

FIG. 1b is another flowchart of a data processing method provided by an exemplary embodiment of the present disclosure, which may be applicable to any device with wireless communication function, such as a router, a mobile phone, etc., which is not limited by the present disclosure. The method comprises at least the following steps:

In S101, it is determined whether a type of a next data packet to be received is a preset type, and if so, step S102 is performed. It is worth noting that the next data packet to be received as mentioned here refers to the next data packet to be received in the transmission queue. Whereas at the current timing, the transmission queue may be processing an enqueue operation or dequeue operation of a certain packet (e.g., the current packet). Of course, at the current timing, the transmission queue may be in an idle state as well, which is not limited by the present disclosure.

For example, the preset type of the next data packet to be received may be determined through the data packet group information of the data packet group to which the next data packet to be received belongs. Correspondingly, step S101 further includes the following sub-steps: in S01, acquiring group information of a data packet group to be transmitted in a first preset time period; in S02, determining the type of the data packet according to the group information; wherein, the group information includes a data packet type corresponding to a data packet group, the data packet group contains a plurality of data packets, the data packet type is used to indicate the types of the plurality of data packets, the types of the respective data packets among the plurality of data packets are the same, the plurality of data packets include the said data packet, and the first preset time period contains the current timing and the receiving timing.

Optionally, the data packet type of the data packet group may be received from other functional modules (such as the data preprocessing module), and the data packet type may be automatically labeled by other modules according to the application type to which the data packet belongs.

Optionally, the aforementioned data packet types may be related to application types, such as games, industrial automation control, voice, and social chat. The aforementioned preset type may be game and/or industrial automation control.

In S102, it is determined whether a duration from current timing to receiving time for the data packet is a preset duration, and if so, step S103 is performed. Wherein, the preset duration (i.e., preset contention duration) may be an average contention duration of a plurality of contention durations corresponding to a plurality of reference data packets within a third preset period. Wherein, the third preset time period may be a passed time period with the preset duration with respect to the current timing.

Specifically, the receiving timing for the data packet is the timing when the transmission queue receives the data packet. The preset duration is also called the preset contention duration (e.g., Tcontent as described in detail above), and its value is an expected time consumed for a channel contention-related operation (i.e., the above-mentioned operations such as carrier sensing, waiting for a distributed inter-frame spacing DIFS, and waiting for a back-off window) determined by the wireless device according to the transmitting cycle of the data packet to be transmitted and/or the type of the data packet to be transmitted. The present disclosure is not limited thereto.

It should be noted that "carrier sensing duration" and "back-off window length" in the preset contention duration are random and variable within a certain range as the network state changes (networks with other WIFI signals). Therefore, in some embodiments of the present disclosure, the preset duration may be dynamically set according to the actual network environment, which is not limited by the present disclosure.

In S103, a channel contention operation related to transmitting the data packet is initiated, so that after the data packet enters the transmission queue of the transmitting terminal, the data packet is accessed to the channel and transmitted, wherein the channel contention operation related to transmitting the data packet includes carrier sensing, waiting for a distributed inter-frame spacing DIFS, and waiting for a back-off window.

For example, if the group information indicates that the data packet type corresponding to the data packet group is the preset type, then upon receiving any data packet among the plurality of data packets, any data packet will be inserted into the head of a queue. Wherein, the queue is the queue where the data packet to be transmitted is located before being transmitted, and the data packets stored in the queue are transmitted from the head of the queue.

Furthermore, in the actual scenario, the data packet transmitting cycle corresponding to the aforementioned data packet group, i.e., the data packet transmitting cycle corresponding to the first preset time period, and the preset duration may vary with the change of the data packet type and the change of the wireless environment, and may only be fixed value for a certain period of time. Based on this, various embodiments of the present disclosure may further optionally include calibration of the data packet transmitting cycle corresponding to the first preset time period and the preset duration.

For example, various embodiments of the present disclosure optionally comprise the following steps of adjusting the first preset time period. The steps comprise: acquiring a data packet transmitting cycle corresponding to a second preset time period, and if the difference between the data packet transmitting cycle corresponding to the second preset time period and the data packet transmitting cycle corresponding to the first preset time period is greater than a first preset threshold, then determining a reference cycle according to the second preset time period and the number of data packets transmitted within the second preset time period; and taking the reference cycle as a data packet transmitting cycle corresponding to the first preset time period; wherein the second preset time period is determined according to a preset calibrating cycle, and the data packet transmitting cycle corresponding to the first preset time period is the same as the data packet transmitting cycle corresponding to the data packet. Determining a reference cycle according to the second preset time period and the number of data packets transmitted within the second preset time period comprises: taking the ratio of the second preset time period to the number of data packets transmitted within the second preset time period as the reference cycle.

Further, the method further comprises: acquiring a contention duration corresponding to a second preset time period, and if the difference between the contention duration corresponding to the second preset time period and the preset duration is greater than a second preset threshold, then determining a reference contention duration according to the second preset time period and a number of contentions for data packets within the second preset time period; and taking the reference contention duration as the preset duration; determining a reference contention duration according to the second preset time period and a number of contentions for data packets within the second preset time period comprises: taking the ratio of the total contention duration within the second preset time period to the number of contentions for data packet as the reference contention duration.

Specifically, the starting timing of the second preset time period is later than the starting timing of the first preset time period, and the ending timing of the second preset time period may be earlier, equal to or later than the ending timing of the first preset time period.

Wherein, the preset duration may be an average contention duration of a plurality of contention durations corresponding to a plurality of reference data packets within the third preset time period. Wherein, the third preset time period may be a passed time period with the preset duration with respect to the current timing.

In some optional embodiments of the present disclosure, the determination of the transmitting cycle corresponding to the data packet and the preset time duration can be performed according to the aforementioned preset calibrating cycle, and the aforementioned duration according to the preset calibrating cycle may be the same as the duration of the second preset time period.

The scheme provided by the present disclosure can play a role in shortening the communication delay of data packets that require high real-time communication and improving communication efficiency.

Figure 2:
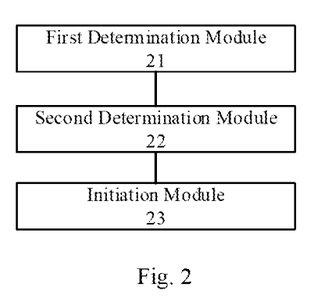
FIG. 2 is a structural diagram of a data processing apparatus provided by an embodiment of the present disclosure.

FIG. 2 is a structural diagram of a data processing apparatus provided by an exemplary embodiment of the present disclosure; wherein the apparatus includes a first determination module 21, a second determination module 22 and an initiation module 23, wherein:

the first determination module 21, for determining whether a type of a next data packet to be received is a preset type, and if so, the second determination module 22 determines whether a duration from a current timing and a receiving timing of the data packet is a preset duration, and if so, the initiation module 23 initiates a channel contention operation related to transmitting the data packet, so that after reception of the data packet, the data packet gets access to the channel and then is transmitted over the channel, wherein the channel contention operation related to transmitting the data packet includes carrier sensing, waiting for a distributed inter-frame spacing DIFS, and waiting for a back-off window.

Optionally, the apparatus is further used for: acquiring group information of a data packet group to be transmitted in a first preset time period; and determining the type of the data packet according to the group information; wherein the group information includes a data packet type corresponding to the data packet group, the data packet group includes a plurality of data packets, the data packet type is used to indicate the types of the plurality of data packets, the types of the respective data packets among the plurality of data packets are the same, the plurality of data packets include the said data packet, and the first preset time period includes the current timing and the receiving time.

Optionally, the apparatus is further used for: if the group information indicates that the data packet type corresponding to the data packet group is the preset type, then determining to insert, upon receiving any data packet among the plurality of data packets, the any data packet into the head of a queue; wherein, the queue is the queue where the data packet to be transmitted is located before being transmitted.

Optionally, the apparatus is further used for: acquiring a data packet transmitting cycle corresponding to a second preset time period, and if the difference between the data packet transmitting cycle corresponding to the second preset time period and the data packet transmitting cycle corresponding to the first preset time period is greater than a first preset threshold, then determining a reference cycle according to the second preset time period and the number of data packets transmitted within the second preset time period; and taking the reference cycle as a data packet transmitting cycle corresponding to the first preset time period; wherein the second preset time period is determined according to a preset calibrating cycle, and the data packet transmitting cycle corresponding to the first preset time period is the same as the data packet transmitting cycle corresponding to the data packet.

Optionally, the apparatus, when used for determining a reference cycle according to the second preset time period and the number of data packets transmitted within the second preset time period, is specifically used for: taking the ratio of the second preset time period to the number of data packets transmitted within the second preset time period as the reference cycle.

Optionally, the above apparatus is further used for: acquiring a contention duration corresponding to a second preset time period, and if the difference between the contention duration corresponding to the second preset time period and the preset duration is greater than a second preset threshold, then determining a reference contention duration according to the second preset time period and a number of contentions for data packets within the second preset time period; and taking the reference contention duration as the preset duration.

Optionally, the above apparatus, when used for determining a reference contention duration according to the second preset time period and a number of contentions for data packets within the second preset time period, is specifically used for: taking the ratio of the total contention duration within the second preset time period to the number of contentions for data packet as the reference contention duration.

It should be understood that the apparatus embodiment and the method embodiment can correspond to each other, and similar descriptions can refer to the method embodiment, which will not be detailed here in order to avoid repetition. Specifically, the apparatus may perform the above-mentioned method embodiments, and the aforementioned and other operations and/or functions of respective modules in the apparatus are respectively for the corresponding flows in the respective methods in the above-mentioned method embodiments, which will not be detailed here for brevity.

The apparatus of the embodiments of the present disclosure has been described above from the perspective of functional modules in combination with the drawings. It should be understood that the functional modules can be implemented by means of hardware, by means of instructions in the form of software, or by means of a combination of hardware and software modules. Specifically, each step of the method embodiments in the embodiments of the present disclosure can be completed by an integrated logic circuit of hardware and/or instructions in the form of software in the processor, and the steps of the methods disclosed in combination with the embodiment of the present disclosure can be directly embodied as the completion of execution by a hardware coding processor or the completion of execution by a combination of hardware and software modules in the coding processor. Optionally, the software module can be located in a mature storage medium such as random access memory, flash memory, read-only memory, programmable read-only memory, electrically erasable programmable memory, registers, etc. The storage medium is located in the memory, and the processor reads the information in the memory and completes the steps in the above method embodiments in combination with its hardware.

Figure 3:
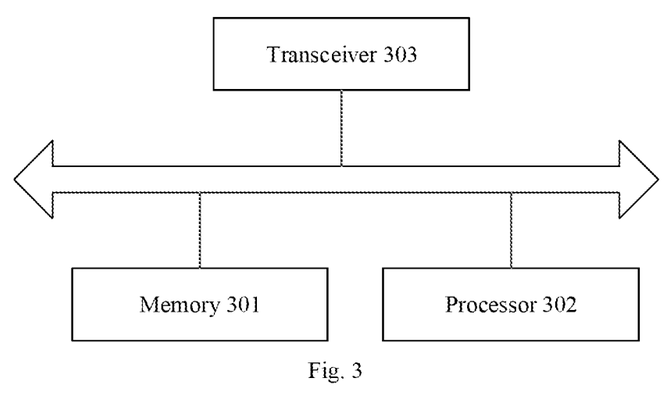
FIG. 3 is a structural diagram of an electronic device provided by an embodiment of the present disclosure.

FIG. 3 is a schematic block diagram of an electronic device provided by an embodiment of the present disclosure, which may include:
  a memory 301 and a processor 302, wherein the memory 301 is used for storing a computer program and transmitting the code of the program to the processor 302. In other words, the processor 302 may call and run the computer program from memory 301 to implement the method in the embodiments of the present disclosure.

For example, the processor 302 may be used to perform the above method embodiments according to instructions in the computer program.

In some embodiments of the present disclosure, the processor 302 may include, but is not limited to:
  general processor, Digital Signal Processor (DSP), application-specific integrated circuit (ASIC), Field Programmable Gate Array (FPGA) or other programmable logic device, discrete gate or transistor logic device, discrete hardware component, and so on.

In some embodiments of the present disclosure, the memory 301 includes, but is not limited to:
  volatile memory and/or nonvolatile memory. Wherein, the nonvolatile memory may be Read-Only Memory (ROM), programmable ROM (PROM), erasable PROM (EPROM), electric EPROM (EEPROM) or flash memory. The volatile memory may be a Random Access Memory (RAM), which is used as an external cache. By way of illustration, but not limitation, many forms of RAM are available, such as static RAM (SRAM), dynamic RAM (DRAM), synchronous DRAM (SDRAM), Double Data Rate SDRAM (DDR SDRAM), enhanced SDRAM (ESDRAM), synchronous link DRAM (SLDRAM) and Direct Rambus RAM (DR RAM).

In some embodiments of the present disclosure, the computer program may be divided into one or more modules, which are stored in the memory 301 and executed by the processor 302 to complete the methods provided by the present disclosure. The one or more modules may be a series of computer program instruction segments that can accomplish specific functions, and the instruction segments are used to describe the execution process of the computer program in the electronic device.

As shown in FIG. 3, the electronic device may further include: a transceiver 303, which may be connected to the processor 302 or the memory 301.

The processor 302 may control the transceiver 303 to communicate with other devices, specifically, it can transmit information or data to other devices or receive information or data transmitted by other devices. The transceiver 303 may include a transmitter and a receiver. The transceiver 303 may further include antennas, and the number of antennas may be one or more.

It should be understood that respective components in the electronic device are connected through a bus system, wherein the bus system includes a power bus, a control bus and a state signal bus in addition to a data bus.

The present disclosure further provides a computer-readable storage medium having stored there on a computer program which, when executed by a computer, enables the computer to perform the methods of the above method embodiments. In other words, the embodiments of the present disclosure further provides a computer program product containing instructions which, when executed by a computer, cause the computer to perform the methods of the above method embodiments.

When implemented in software, it can be fully or partially implemented in the form of a computer program product. The computer program product includes one or more computer instructions. When the computer program instructions are loaded and executed on a computer, the flow or function according to the embodiments of the present disclosure is generated in whole or in part. The computer can be a general-purpose computer, a special-purpose computer, a computer network, or other programmable apparatuses. The computer instructions can be stored in a computer-readable storage medium or transmitted from one computer-readable storage medium to another. For example, the computer instructions can be transmitted from one website, computer, server or data center to another website, computer, server or data center by wired (e.g., coaxial cable, optical fiber, digital subscriber line (DSL)) or wireless (e.g., infrared, radio, microwave, etc.). The computer-readable storage medium can be any available medium that a computer can access or a data storage device such as a server or a data center that is integrated by including one or more available media. The available medium may be a magnetic medium (e.g., floppy disk, hard disk, magnetic tape), an optical medium (e.g., digital video disc (DVD)), or a semiconductor medium (e.g., solid state disk (SSD)) and the like.

Ordinary skilled in the art can recognize that the modules and algorithm steps of various examples described in connection with the embodiments disclosed herein can be implemented in electronic hardware, or a combination of computer software and electronic hardware. Whether these functions are implemented in hardware or software depends on the specific application and design constraints of the technical scheme. Professionals can use the method that the difference is greater than the first preset threshold value for each specific application to realize the described function, but such implementation should not be considered as beyond the scope of the present disclosure.

In several embodiments provided by the present disclosure, it should be understood that the disclosed systems, apparatuses and methods can be implemented in other ways. For example, the apparatus embodiment described above is merely schematic. For example, the division of the module is merely a logical functional division. In actual implementation, there may be other division methods, such as multiple modules or components can be combined or integrated into another system, or some features can be ignored or not executed. On the other hand, the mutual coupling or direct coupling or communication connection shown or discussed can be indirect coupling or communication connection through some interfaces, apparatuses or modules, which can be electrical, mechanical or other forms.

The modules illustrated as separate components may be or may not be physically separated, and the components displayed as modules may be or may not be physical modules, that is, they may be located in one place or may be distributed onto multiple network units. Some or all of the modules can be selected according to actual needs to achieve the purpose of the embodiments. For example, various functional modules in various embodiments of the present disclosure may be integrated in one processing module, or various modules may exist separately physically, or two or more modules may be integrated in one module.

The above is only the specific implementation of the present disclosure. However, the protection scope of the present disclosure is not limited to this. The changes or substitutions that can be easily conceived of by any skilled person familiar with the technical field within the technical scope disclosed by the present disclosure, should be all included in the protection scope of the present disclosure. Therefore, the protection scope of the present disclosure should be based on the protection scope of the claims.

What is claimed is:

1. A data processing method performed by a transmitting terminal, the method comprising:
   in response to a type of data packet to enter a transmission queue of the transmitting terminal being a preset type, determining a timing when the data packet is expected to enter a head of the transmission queue of the transmitting terminal as an expected transmitting timing, wherein the transmission queue of the transmitting terminal is a queue where the data packet to be transmitted is located before leaving the transmitting terminal; and
   in response to a duration from current timing to the expected transmitting timing being within a preset range, initiating a channel contention operation related to transmitting the data packet, wherein the channel contention operation related to transmitting the data packet includes carrier sensing, waiting for a distributed inter-frame spacing DIFS, and waiting for a back-off window.

2. The method according to claim 1, further comprising:
   in response to the channel contention operation related to transmitting the data packet and the data packet entering the head of the transmission queue of the transmitting terminal, making the data packet get access to a channel and transmitting the data packet.

3. The method according to claim 2, wherein making the data packet get access to a channel and transmitting the data packet comprises:
   after the data packet enters the transmission queue of the transmitting terminal, adding the data packet to the head of the transmission queue; and
   according to the order from the head of the queue to a tail of the queue, feeding data packets in the transmission queue into the channel sequentially and transmitting the data packets.

4. The method according to claim 1, wherein determining a timing when the data packet is expected to enter a head of the transmission queue of the transmitting terminal as an expected transmitting timing comprises:
   based on the type of the data packet being a preset type, determining a transmitting cycle of the data packet with the preset type; and
   based on the transmitting cycle of the data packet with the preset type, determining a timing when the data packet is expected to enter the head of the transmission queue of the transmitting terminal as an expected transmitting timing.

5. The method according to claim 1, wherein initiating a channel contention operation related to transmitting the data packet comprises:
   based on the type of the data packet being a preset type, determining a transmitting cycle of the data packet with the preset type;
   estimating a duration required for performing the channel contention operation related to transmitting the data packet as an expected contention duration for data packet; and
   based on the transmitting cycle of the data packet and the expected contention duration, determining a timing to initiate the channel contention operation related to transmitting the data packet, and initiating the channel contention operation related to transmitting the data packet at the timing.

6. The method according to claim 1, wherein determining that a type of a data packet to enter a transmission queue of the transmitting terminal is a preset type comprises:

acquiring group information of a data packet group to enter the transmission queue of the transmitting terminal; and determining the type of the data packet as a preset type according to the group information;

wherein, the group information includes a data packet type corresponding to the data packet group, the data packet group includes a plurality of data packets, the data packet type is used to indicate the types of the plurality of data packets, the types of the respective data packets among the plurality of data packets are the same, and the plurality of data packets include the said data packet to enter the transmission queue of the transmitting terminal.

7. The method according to claim 6, further comprising: in response to the group information indicating that the data packet type corresponding to the data packet group is the preset type, upon receiving one data packet among the plurality of data packets, inserting the one data packet into the head of the transmission queue.

8. The method according to claim 4, further comprising: periodically calibrating the preset range and the transmitting cycle of the data packet according to a preset calibrating cycle.

9. A data processing method, comprising:

determining whether a type of a next data packet to be received is a preset type, and if so, determining whether a duration from a current timing to a receiving timing of the data packet at a head of the transmission queue is a preset duration, and if so, initiating a contention process for the data packet, so that after reception of the data packet, the data packet gets access to a channel and is transmitted over the channel, wherein the contention process includes carrier sensing, waiting for a distributed inter-frame spacing DIFS, and waiting for a back-off window.

10. The method according to claim 9, wherein the method further comprises:

acquiring group information of a data packet group to be transmitted in a first preset time period; and determining the type of the data packet according to the group information;

wherein the group information includes a data packet type corresponding to the data packet group, the data packet group includes a plurality of data packets, the data packet type is used to indicate the types of the plurality of data packets, the types of the respective data packets among the plurality of data packets are the same, the plurality of data packets include the said data packet, and the first preset time period includes the current timing and the receiving time.

11. The method according to claim 10, wherein the method further comprises:

if the group information indicates that the data packet type corresponding to the data packet group is the preset type, then determining to insert, upon receiving any data packet among the plurality of data packets, the any data packet into the head of a queue;

wherein, the queue is the queue where the data packet to be transmitted is located before being transmitted.

12. The method according to claim 10, wherein the method further comprises:

acquiring a data packet transmitting cycle corresponding to a second preset time period, and if a difference between the data packet transmitting cycle corresponding to the second preset time period and the data packet transmitting cycle corresponding to a first preset time period is greater than a first preset threshold, then determining a reference cycle according to the second preset time period and a number of data packets transmitted within the second preset time period; and taking the reference cycle as a data packet transmitting cycle corresponding to the first preset time period;

wherein the second preset time period is determined according to a preset calibrating cycle, and the data packet transmitting cycle corresponding to the first preset time period is the same as the data packet transmitting cycle corresponding to the data packet.

13. The method according to claim 12, wherein determining a reference cycle according to the second preset time period and the number of data packets transmitted within the second preset time period comprises:

taking a ratio of the second preset time period to the number of data packets transmitted within the second preset time period as the reference cycle.

14. The method according to claim 10, wherein the method further comprises:

acquiring a contention duration corresponding to a second preset time period, and if a difference between the contention duration corresponding to the second preset time period and a preset duration is greater than a second preset threshold, then determining a reference contention duration according to the second preset time period and a number of contentions for data packets within the second preset time period; and taking the reference contention duration as the preset duration.

15. The method according to claim 14, wherein determining a reference contention duration according to the second preset time period and a number of contentions for data packets within the second preset time period comprises:

taking a ratio of a total contention duration within the second preset time period to the number of contentions for data packet as the reference contention duration.

16. An electronic device, comprising:

a processor; and a memory, for storing executable instructions of the processor;

wherein the processor is configured to perform the method of claim 1 by executing the executable instructions.

* * * * *